Dec. 9, 1941. E. A. ROCKWELL 2,265,817
VALVE
Original Filed June 27, 1935 5 Sheets-Sheet 3
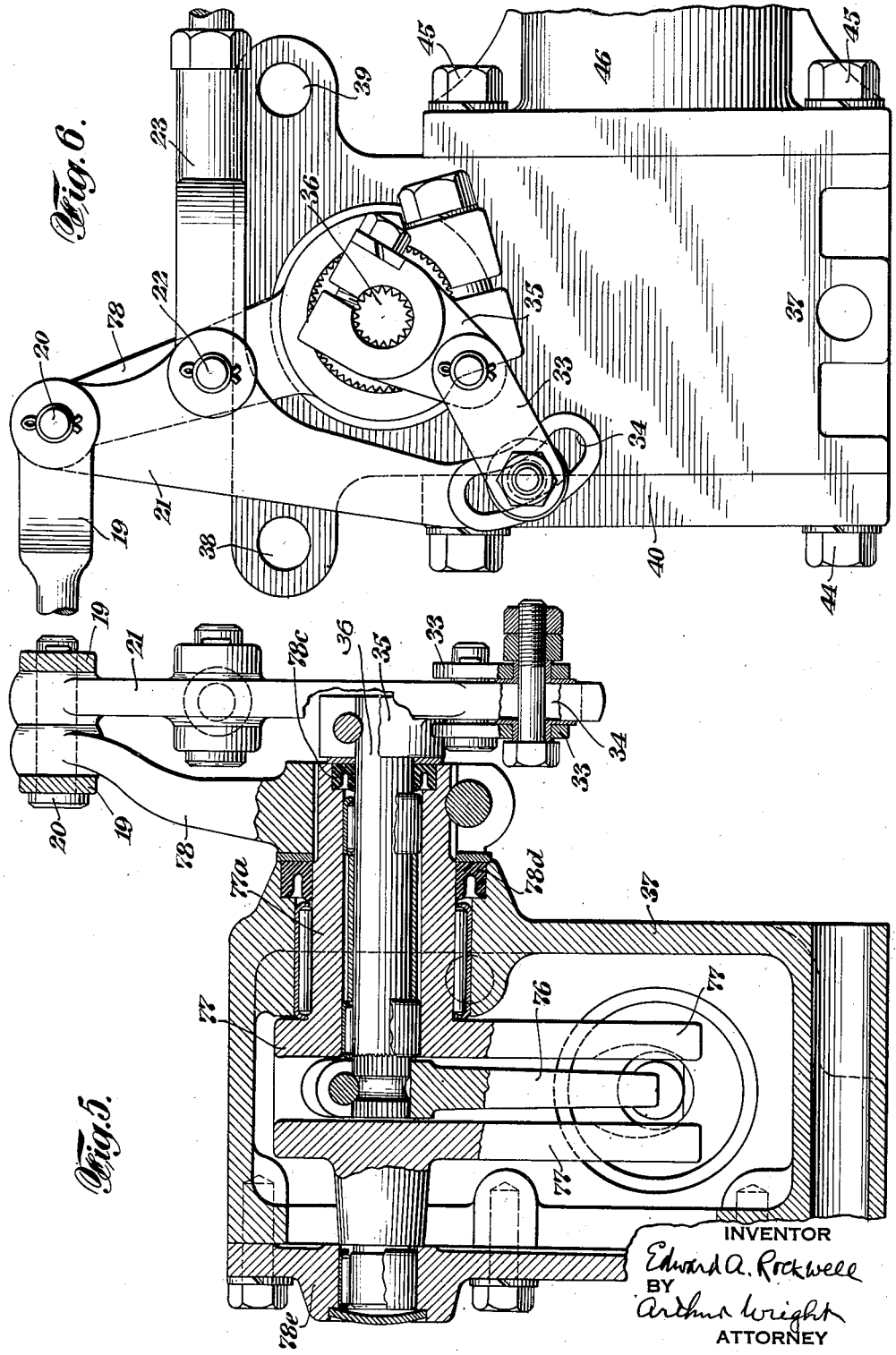

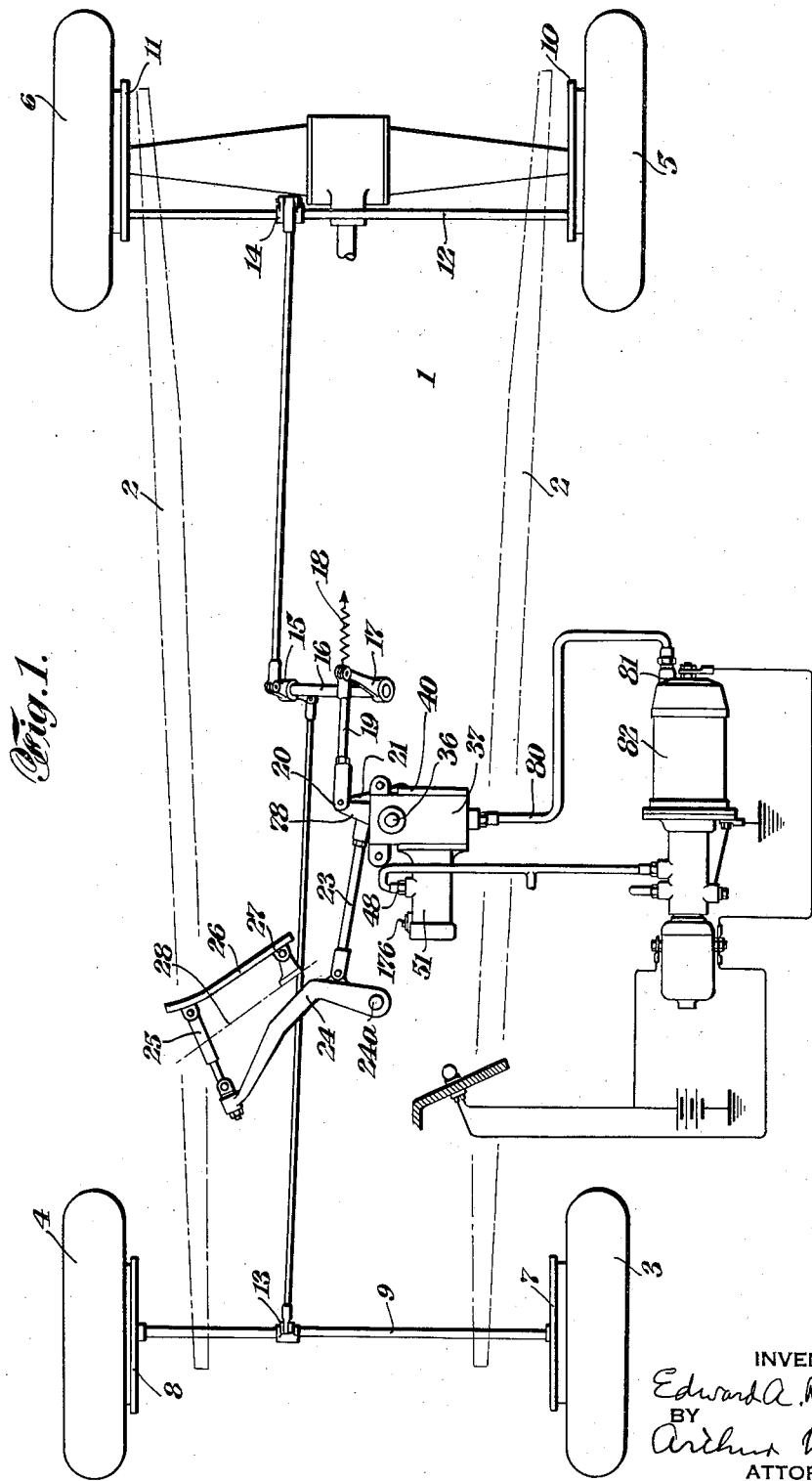

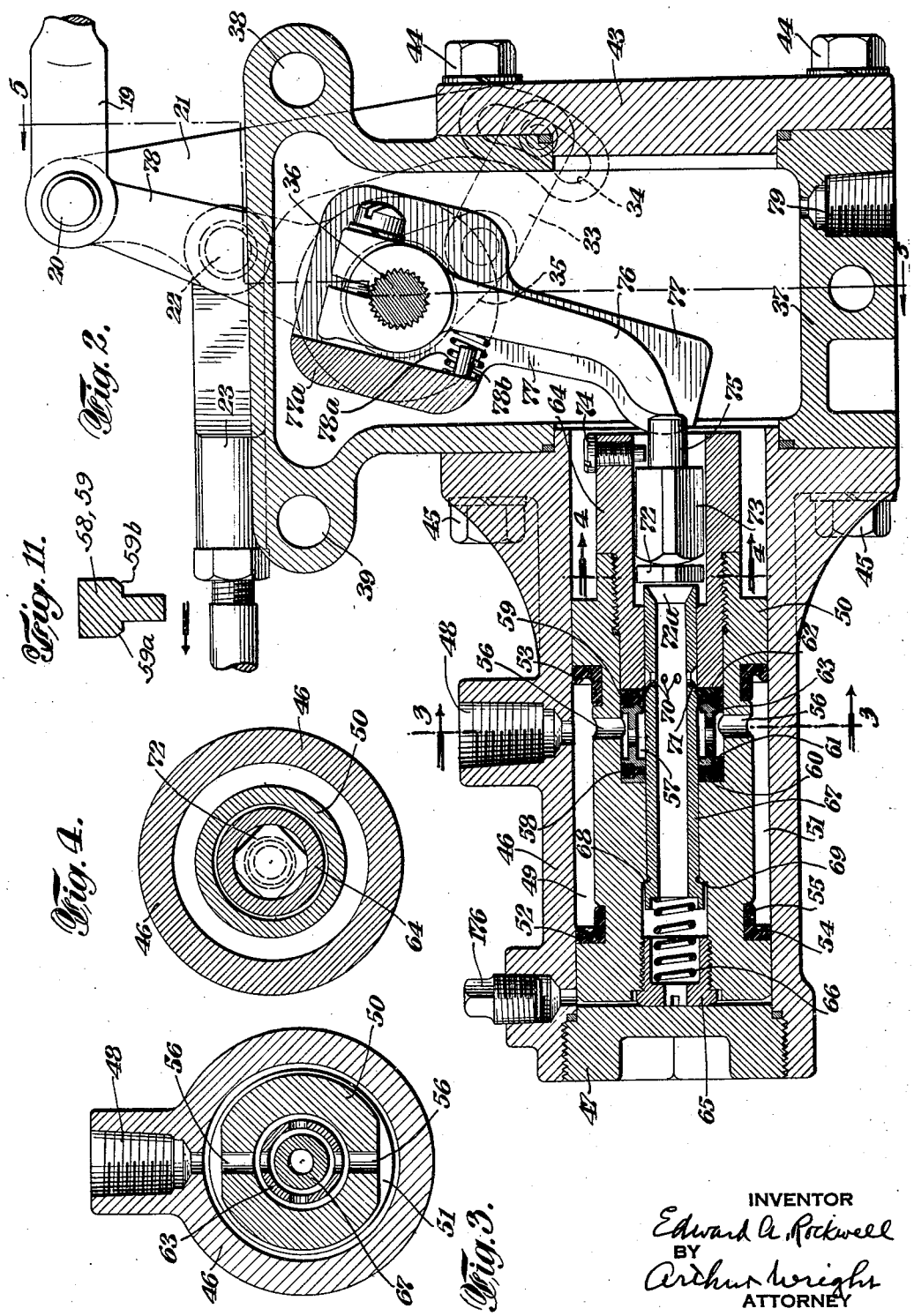

Dec. 9, 1941.   E. A. ROCKWELL   2,265,817
VALVE
Original Filed June 27, 1935   5 Sheets-Sheet 4
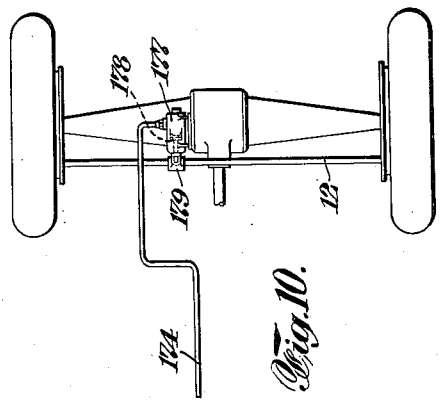
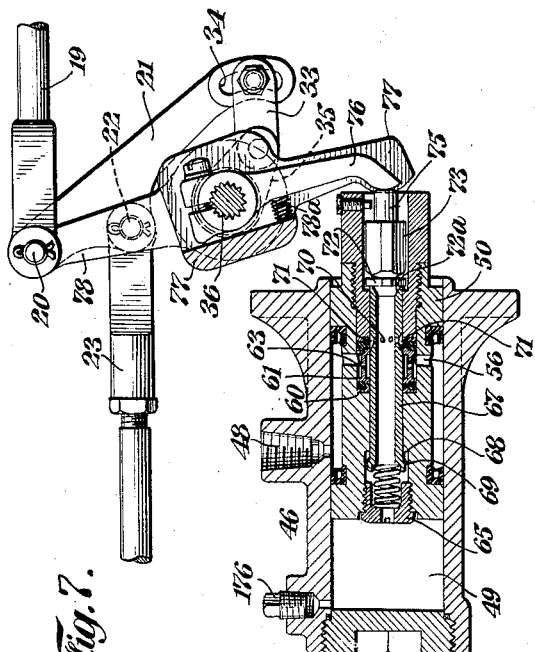
INVENTOR
Edward A. Rockwell
BY
Arthur Wright
ATTORNEY Dec. 9, 1941.  E. A. ROCKWELL  2,265,817
VALVE
Original Filed June 27, 1935   5 Sheets-Sheet 5
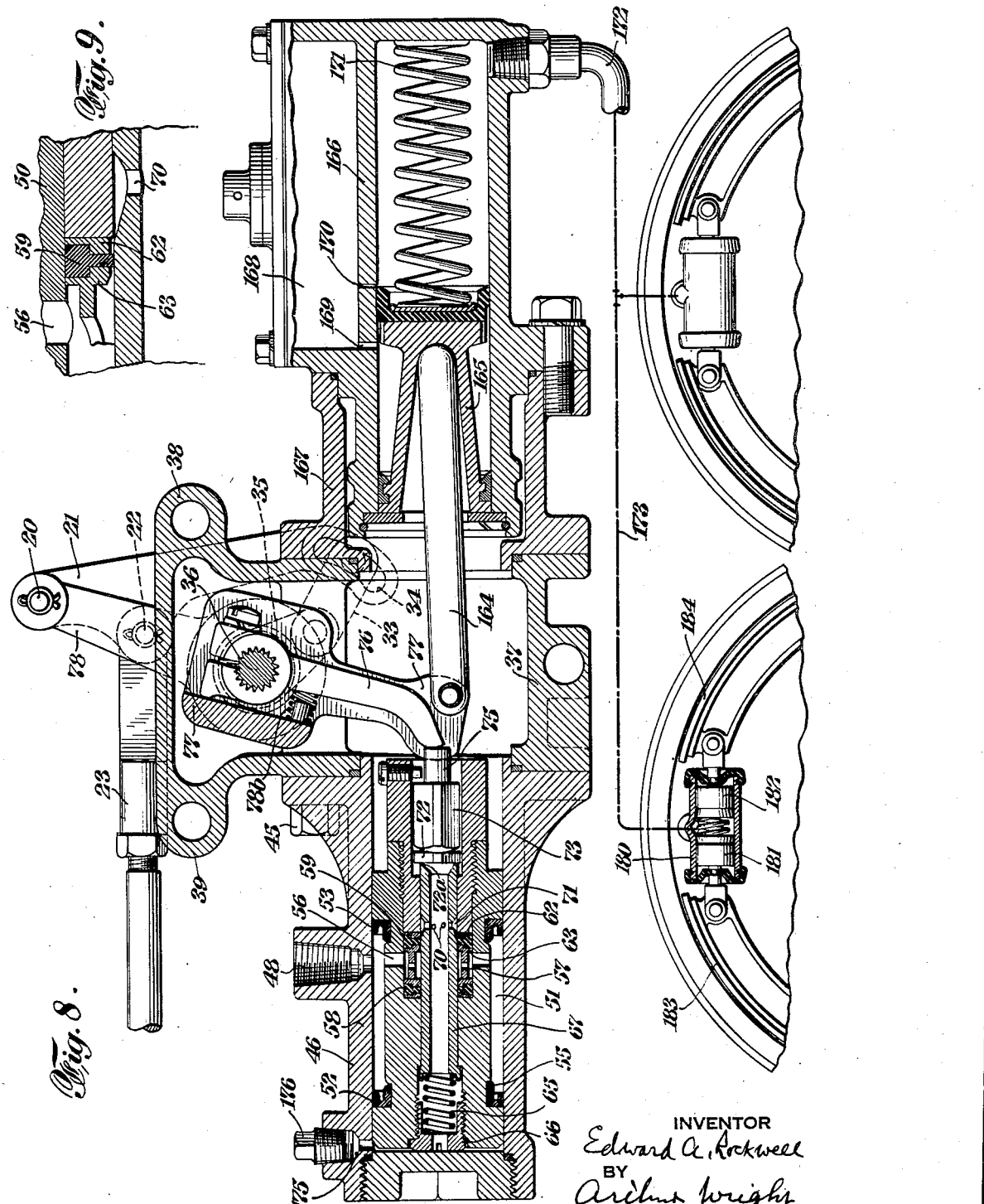
INVENTOR
Edward A. Rockwell
BY
Arthur Wright
ATTORNEY Patented Dec. 9, 1941

2,265,817

UNITED STATES PATENT OFFICE 2,265,817

VALVE

Edward A. Rockwell, Forest Hills, N. Y., assignor to General Auto Parts Corporation, a corporation of Delaware Original application June 27, 1935, Serial No. 28,699, now Patent No. 2,136,638, dated November 15, 1938. Divided and this application October 12, 1938, Serial No. 234,637

10 Claims. (Cl. 121—46.5)

My invention relates particularly to a valve by means of which modulated hydraulic pressure can be obtained for the operation of accessories for automotive vehicles and other power installations.

This is a division of my co-pending application upon Electro flow power supply systems, Ser. No. 28,699, filed June 27, 1935, Patent No. 2,136,638, granted November 15, 1938.

The object of my invention is to provide a valve so as to provide an effective system for the supply of power wherever desired but particularly in connection with automobiles, as, for instance, in the operation of automobile accessories. By means of my invention the different accessories of an automobile may be effectively operated by power in addition to the manual power applied thereto, but coordinated in extent to the manual pressure applied. It is particularly useful in connection with the operation of automobile brakes of any desired character, whether mechanical power brakes or hydraulically operated brakes. A further object is to provide a liquid medium for transmitting the additional power, and which is controlled by the presence of sealing rings carried by the relatively moving parts. The rings are so constructed as to be unaffected by the liquid used, and preserve completely-tight joints without leakage and without the interposition of springs.

My apparatus, furthermore, is based on the use of a liquid under pressure, which is, however, utilized at any given time, in only small amounts of the liquid, but which has a storage capacity under pressure so that there is no appreciable lag in the operation of the apparatus. Also, there is used a system of valve seals permitting the use of a low viscosity liquid.

Further objects of my invention will appear from the detailed description of the same hereinafter.

While my invention is capable of being carried out in many different ways, for the purpose of illustration I have shown only certain forms of my invention in the accompanying drawings, in which—

Fig. 1 is a diagrammatic view of an automobile equipped with my invention as applied to the operation of brakes;

Fig. 2 is a vertical section, enlarged, showing the booster unit for the brake;

Fig. 3 is a vertical section of the same taken on line 3—3;

Fig. 4 is another vertical section of the same taken on line 4—4;

Fig. 5 is a transverse vertical section showing the booster unit;

Fig. 6 is an end elevation showing the said booster unit;

Fig. 7 is a similar view showing the position of the levers after the boosting power has been applied and the parts have come to a static position with the pressure of the booster balanced against the foot pressure;

Fig. 8 is a vertical section of the booster unit shown as applied to the operation of the hydraulic brake system;

Fig. 9 is an enlarged section showing the position of the valve in the booster when closed;

Fig. 10 shows the arrangement for connecting the rear wheel brakes to the forward end of the booster cylinder and Fig. 11 is a cross-section of one of the rubber seals showing the beveled edges thereon.

Referring to the mechanically operated system for operating a brake, I have shown, in Fig. 1, an automobile 1 having a frame 2 for connection in the usual way with front wheels 3 and 4 and rear wheels 5 and 6. The front wheels 3 and 4 are provided with brakes 7 and 8, of any desired type, which are operated by a cross-shaft 9. Similarly, the rear wheels 5 and 6 are provided with brakes 10 and 11 of any desired type, which are operated by a cross-shaft 12. The shafts 9 and 12 are provided with operating levers 13 and 14, respectively, which lead to the opposite ends of a rocker lever 15 carried near the center thereof upon a cross-shaft 16, on one end of which there is an operating lever 17. The lever 17, at its end, is provided with a pull-back spring 18 fastened to the frame 2 in any desired way, and a link 19 which leads to a pivot 20. On the pivot 20 there is also carried a manually-actuated lever 21 which is connected by pivot 22 to a link 23, pivoted in turn to a brake lever 24 which is pivoted on a shaft 24a, the outer end of which is connected by a link 25 to a brake pedal 26 supported on a pivot 27 carried in a bracket on a floor-board 28. When pressure is applied to the brake pedal 26 the lever 21 is moved upon the pivot 20 as the reaction point and thence transmit the manual movement to a link 33 which has an adjustable pivotal support in a curved slot 34 at the end of said lever 21. The link 33, in turn, is connected to a lever 35 which is tight on a shaft 36 which is journaled in a rear booster housing 37, mounted by means of bolts 38 and 39 upon any desired part of the chassis. The said rear booster housing 37 is closed at the rear with a cover plate 43 secured thereon by screws 44 and the rear booster housing 37 is secured by screws 45 to a main booster housing 46 closed at the forward end thereof with a screw-cover 47.

The liquid for transmitting the boosting power is of any desired character, as, for example, the usual hydraulic brake fluid, but may, for instance, be comprised partly of castor oil, and preferably more castor oil for lubrication than in the usual hydraulic brake liquid, and in which there is carried a large amount of a constituent to prevent freezing under all atmospheric conditions, such, for example, as an alcohol. The alcohol added thereto also makes the liquid less viscous. This liquid is supplied under pressure by an inlet port 48 in the top of main booster housing 46 and thence into a cylindrical chamber 49 therein in which a plunger 50 is arranged to reciprocate. The plunger 50 has an annular recess 51, the two ends of which are closed by sealing rings 52 and 53 which are of any desired composition, but preferably a rubber, and for this purpose there may be advantageously used what is known as "rosin rubber" such as is used in hydraulic brakes and which is unaffected by the liquid which conveys the power, as above referred to. It will be noted that each of these rings 52 and 53 has an outer sealing lip, or flange, 54, which prevents any leakage around the periphery of the same, but which, because of its small size, does not exert undue friction. Also, the inner portion of the ring is provided with a longer lip, or flange, 55 which retains the ring against the plunger 50 to prevent any leakage beneath the same. The flanges 54 and 55 are sealed by opposing radial pressures. Due to the opposed faces of the rings 52 and 53, the presence of the liquid in the annular space 49 will not move the plunger 50. From this point the liquid, under pressure, passes by a series of radiating ports 56 to an internal annular recess 57 in which there are two annular sealing rings 58 and 59 of the same kind of rubber as above, carrying outer circular shoulders to prevent their entering the valve ports hereinafter described, said rings being clamped in place so as to produce effectively-sealing internal surfaces of a reduced area, by means of rings 60, 61 and 62 and a perforated spacing ring 63, with the aid of a hollow head 64 screw-threaded into the end of the plunger 50, the edges of the outer enlargements of the seals 58 and 59 being beveled on their innermost edges at 59a and 59b to permit the rubber to expand into the corners of the rings 60, 61, 62, 63 under pressure and so as to prevent the inner peripheries from exerting too much friction in the movement of the valve 67. In this way sticking is prevented. In the interior of the plunger 50 there is provided at the other end, a hollow screw-threaded plug 65 carrying a spring 66 therein which tends to press towards the rear a tubular valve 67 having a shoulder 68 to act as a stop against a shouldered bore 69, in which the tubular valve 67 reciprocates. Near the rear end of the tubular valve 67 there are a plurality of radiating ports 70 which communicate with a tapered recess 71 leading to the exterior of the tubular valve and so as to establish communication with the annular space 57 when the valve 67 is moved forwardly. The forward movement of said valve 67 is accomplished manually by pressure exerted upon a squared port-closing member 72, which is adapted to close a port 72a the rearmost end of which is smaller in area at the place where it contacts with the member 72 than the area at the forward end of the valve to prevent chattering. The over-balancing effect of the spring 66 also tends to prevent the chattering effect. The member 72 is operated by the movement of a squared plunger 73 held in the head 64 by a screw 74 and which has an operating stem 75 contacting with the end of a lever 76 tight on the shaft 36. When the liquid under pressure is admitted to the interior of the tubular valve 67 by the forward movement of the latter, due to the movement of the lever 76 by the brake pedal, the recess 71 will be brought into communication with the annular recess 57 admitting the oil under pressure to the bore within the tubular valve 67 so that the pressure of the liquid will then be exerted through the opening in the closure 65 against the cover 47 at the front end of the booster and the pressure thus produced at the front end of the plunger 50 will cause said plunger to move rearwardly until the pressure on the plunger 50 has substantially equalized the pressure applied by the foot, it being understood that when this takes place the spring 66 will have closed the ports 70 by causing the sealing ring 59 to overlie the external cylindrical portion of the tubular valve 67, as shown in Fig. 2 due to the follow-up action of the linkage. The pressure thus exerted on the plunger 50 by the liquid at the forward end thereof will be transmitted to a forked lever 77 which is carried by a sleeve 77a pivoted in the housing 37 and which sleeve 77a has tight thereon a lever 78 connected to the pivot 20 so that a boosting force will be applied to the brake operating link 19 connected to all of the wheels of the automobile, commensurate with the extent of the foot pressure applied by a pedal 26. A spring 78a, on a stud 78b, on the sleeve 77a, tends to restore the levers 76 and 77 to their initial positions and enables the lever 76 to be moved initially without moving the levers 77. To prevent leakage around the shaft 36 and the sleeve of the lever 77, said shaft 36 is journaled within the sleeve 77 on roller bearings and leakage at this end of the sleeve 77 is prevented by a flanged sealing ring 78c of the rubber material above referred to, and the same end of the sleeve 77 is sealed by a similar sealing ring 78d around the sleeve 77 and within the housing 47. The other end of the sleeve 77 is journaled in a sealed socket in a cover plate 78e on one side of the housing 37. When it is desired to release the pressure from the brakes the decrease of the pressure on the pedal 26 will cause the release, partly or wholly, of the lever 76, thereby permitting the pressure liquid to spill out or escape past the squared plunger 73 to an outlet port 79 in the bottom of the rear housing 37, and thence to a tube 80 which leads to a low pressure port 81 in a pressure accumulator and supply reservoir 82, which is made of thin metal and has appurtenant parts as shown in detail in the parent Patent No. 2,136,638 above referred to.

When it is desired to apply the mechanism to the operation of hydraulically controlled automobile accessories, this may be readily done, as shown in Fig. 8. In this construction the parts are all arranged exactly as previously described herein, except that in this instance the power output, or booster action, is not accomplished by mechanical connections merely. In this instance the lower ends of the levers 77, in actuating the brake, are connected by a link 164 to a piston 165 in a master-cylinder 166 of the same type as customarily used in connection with hydraulic pressure systems, said cylinder 166 having an adapter 167, a supply chamber 168 with a supply port 169, and a leakage-return-port 170, and a spring 171 which serves to retract the piston 165 as well as the levers 77. The cylinder 166 is connected by a hydraulic line 172 to a brake-operating line 173 leading to the front brake, which in this instance, it will be seen, are manually actuated as well as being boosted by the hydraulic pressure. In this instance the rear brakes can be operated by an hydraulic line 174 leading from a port 175 in the forward end of the booster cylinder 46, which end of the cylinder would be otherwise normally closed by a plug 176. The hydraulic line 174, for the operation of the rear brakes, may operate the same at the rear of the car in substantially the same fashion in which the wheel brakes in the front of the car would be operated, that is to say, by admitting the liquid under pressure to the cylinder 177 which operates a piston 178 connected to a lever 179 on the rear operating rod 12. However, if desired, instead of using a construction involving the cylinder 177 and the piston 178, I may mount on the brake bands of each of the wheels, either in the front or in the rear, or both, a double cylinder 180 having therein two pistons 181 and 182, which are connected, respectively, to brake shoes 183 and 184 so that the position of the brake shoes is controlled by the pressure supplied from the line 172, or whichever line is attached thereto.

In the operation of the apparatus, referring first to the operation of the brakes, when the pedal 26 is moved downwardly, this applies manual pressure to the brakes on the four wheels of the car through the lever 24, link 23, lever 21, link 19, levers 17, 15, 13, 14, and shafts 9 and 12, accompanied by the slight movement of the lever 78 to the left, in Fig. 2, but this movement will also move the link 21 to the left, in Fig. 2, and through the link 33 move the lever 35 and the lever 76 to the left, in Fig. 2, thus causing the tubular valve 67 to move inwardly to the left in said figure, thus communicating the high pressure liquid, which is normally under pressure of 500 lbs. per square inch, from the annular chamber 49 to the interior of the tubular valve 67 through the recess 71 and thence to the front of the plunger 50, which will result in the movement of the plunger 50 to the right, in Fig. 2, thereby acting on the lever 77 to exert an additional pull on the brake rod 19 to the left in said figure. This pressure will increase until the pressure of the liquid at the left end of the tubular valve 67, in Fig. 2, exerted towards the right on the lever 76, equalizes the amount of the pressure applied by the foot to the pedal 26. Thereupon, when the pedal movement stops, the tubular valve 67 will close and the plunger 50 will be brought to rest through the follow-up action of the linkage due to the restoring movement of the lever 78 anti-clockwise, in Fig. 2, acting through the movement of the means 35—33 and anti-clockwise movement of the link 21 to restore the valve 67 to lap position with regard to the piston 50. When the foot pedal is released partially or wholly from the foot pedal 26, the liquid under pressure will escape around the closure 72 and thence through the outlet port 79 by reverse modulation, the same as in forward modulation of the tubular valve 67 movement. This low pressure liquid will pass into the reservoir 82 and thence, after being changed to a high pressure fluid, it is supplied to the port 48. Also, upon failure of the high pressure fluid the brakes can still be applied manually through the link 23, lever 21 and link 19. Whenever pedal pressure is released from the link 19 the levers and piston 50 are returned to normal position by the spring 18.

The hydraulic system as in Fig. 8 will operate in a similar manner also, except that in this instance the power, which acts alone, or which acts as a booster if desired, is conveyed by the tubes to the four-wheel brakes so that by the operation of the piston, such as 178, 181, 182, the various parts are actuated with modulated pressure from the force supplied by the foot to the pedal.

While I have described my invention above in detail I wish it to be understood that many changes may be made therein without departing from the spirit of the same.

I claim:

1. A valve, comprising a source of pressure fluid, a slidable valve unit open at both ends and having a valve element controlling the delivery of said pressure fluid for the performance of work, a bored member in which the valve unit is carried having an end chamber, annular resilient seals for the valve member, located in the bore, a pressure fluid inlet between said seals, said valve unit having a passageway therethrough communicating with said chamber, and an aperture in the side of the unit adapted to be brought into communication with the fluid inlet by the movement of the valve unit for receiving said pressure fluid, and a movable member cooperating with the other end of said valve unit to control the position of the valve in the delivery of said fluid in amounts modulated according to the force exerted by said movable member and to control the release of the delivered pressure fluid.

2. A valve, comprising a source of pressure fluid, a slidable valve unit controlling the delivery of said pressure fluid for the performance of work, a bored member in which the valve is carried, annular resilient seals for the valve member, located in the bore, a pressure fluid inlet between said seals, said valve having a passageway adapted to be brought into communication with the fluid inlet for receiving said pressure fluid, and a movable member cooperating with said valve unit to control the position of the valve in the delivery of said fluid in amounts modulated according to the force exerted by said movable member and to control the release of the delivered pressure fluid, said seals being constructed with outer annular enlargements and supporting rings therefor having shoulders adapted to restrict the pressure of the seals on the valve.

3. In combination, a slidable valve member, a plurality of annular resilient seals for said valve member, and means for applying pressure to said annular resilient seals, said seals having means for supporting the same so as to restrict the pressure inwardly, and recesses for permitting the flow of the annular resilient seals under pressure so as to further delimit the pressure exerted inwardly by the sealing members.

4. A valve, comprising a source of pressure fluid, a slidable valve unit open at both ends and having a valve element controlling the delivery of said pressure fluid for the performance of work, a member in which the valve unit is carried having an end chamber, resilient seals for the valve member, located in the member, a pressure fluid inlet between said seals, said valve unit having a passageway therethrough communicating with said chamber, and an aperture in the side of the unit adapted to be brought into communication with the fluid inlet by movement of the valve unit for receiving said pressure fluid, and a movable member cooperating with the other end of said valve unit to control the position of the valve in the delivery of said fluid in amounts modulated according to the force exerted by said movable member and to control the release of the delivered pressure fluid.

5. A valve, comprising a source of pressure fluid, a tubular valve unit open at both ends, containing an inlet valve and an outlet valve, controlling the delivery of said pressure fluid for the performance of work, a cylindrical member in which said valve unit is carried having an end chamber, annular sealing devices for said valves located in said cylindrical member, a pressure fluid inlet between said sealing devices, said valve unit having a passageway therethrough communicating with said chamber, and an aperture in the side of the unit adapted to be brought into communication with the fluid inlet by the movement of the valve unit for receiving said pressure fluid, and a movable member cooperating with the other end of said valve unit to control the position of the valve unit in the delivery of said fluid in amounts modulated according to the force exerted by said movable member and to control the release of the delivered pressure.

6. A valve, comprising a source of pressure fluid, a tubular valve unit open at both ends, containing an inlet valve and an outlet valve, controlling the delivery of said pressure fluid for the performance of work, a cylindrical member in which said valve unit is carried having an end chamber, annular sealing devices for said valves located in said cylindrical member, a pressure fluid inlet between said sealing devices, said valve unit having a passageway therethrough communicating with said chamber, and an aperture in the side of the unit adapted to be brought into communication with the fluid inlet by the movement of the valve unit for receiving said pressure fluid, and a movable member cooperating with the other end of said valve unit to control the position of the valve unit in the delivery of said fluid in amounts modulated according to the force exerted by said movable member and to control the release of the delivered pressure, said valve unit containing a spring to normally close the inlet valve.

7. A valve, comprising a source of pressure fluid, a tubular valve unit open at both ends, containing an inlet valve and an outlet valve, controlling the delivery of said pressure fluid for the performance of work, a cylindrical member in which said valve unit is carried having an end chamber, annular sealing devices for said valves located in said cylindrical member, a pressure fluid inlet between said sealing devices, said valve unit having a passageway therethrough communicating with said chamber, and an aperture in the side of the unit adapted to be brought into communication with the fluid inlet by the movement of the valve unit for receiving said pressure fluid, and a movable member cooperating with the other end of said valve unit to control the position of the valve unit in the delivery of said fluid in amounts modulated according to the force exerted by said movable member and to control the release of the delivered pressure, said valve unit containing a spring to normally close the inlet valve, the pressure fluid being positioned so as to be free from tendency to open the inlet valve in its seated position.

8. A valve mechanism comprising a source of pressure fluid, a valve member having an inlet valve element, a body member in which the valve member reciprocates, having a passageway for transmitting said pressure fluid to the valve member, said valve mechanism having a chamber connected with the periphery of the valve member for receiving said pressure fluid from the body member and having a chamber at one end of said valve member, seals on the body member located on both sides of said peripheral chamber, and means to move the valve member so that the pressure fluid is received by said valve member in a direction other than in the direction of unseating said valve element and admitted therefrom to said last-mentioned chamber at one end of the valve member in amounts modulated according to the force applied by said means and so constructed as to control the release of the admitted pressure fluid from the other end of the valve member, comprising a movable closure movable in a direction to close one end of the first-mentioned valve chamber and a spring acting on the valve member in the opposite direction.

9. A valve mechanism comprising a source of pressure fluid, a valve member having an inlet valve element, a body member in which the valve member reciprocates, having a passageway for transmitting said pressure fluid to the valve member, said valve mechanism having a chamber connected with the periphery of the valve member for receiving said pressure fluid from the body member and having a chamber at one end of said valve member, seals on the body member located on both sides of said peripheral chamber, a spacing member between said seals, and means to move the valve member so that the pressure fluid is received by said valve member in a direction other than in the direction of unseating said valve element and admitted therefrom to said last-mentioned chamber at one end of the valve member in amounts modulated according to the force applied by said means and so constructed as to control the release of the admitted pressure fluid from the other end of the valve member, comprising a movable closure movable in a direction to close one end of the first-mentioned valve chamber and a spring acting on the valve member in the opposite direction.

10. A valve mechanism comprising a source of pressure fluid, a valve member having an inlet valve element, a body member in which the valve member reciprocates, having a passageway for transmitting said pressure fluid to the valve member, said valve mechanism having a chamber connected with the periphery of the valve member for receiving said pressure fluid from the body member and having a chamber at one end of said valve member, seals on the body member located on both sides of said peripheral chamber, a spacing member, containing a pressure fluid inlet port, between said seals, and means to move the valve member so that the pressure fluid is received by said valve member in a direction other than in the direction of unseating said valve element and admitted therefrom to said last-mentioned chamber at one end of the valve member in amounts modulated according to the force applied by said means and so constructed as to control the release of the admitted pressure fluid from the other end of the valve member, comprising a movable closure movable in a direction to close one end of the first-mentioned valve chamber and a spring acting on the valve member in the opposite direction.

EDWARD A. ROCKWELL.